(12) United States Patent
Heitzmann et al.

(10) Patent No.: US 11,403,951 B2
(45) Date of Patent: Aug. 2, 2022

(54) DRIVING ASSISTANCE FOR A MOTOR VEHICLE WHEN APPROACHING A TOLLGATE

(71) Applicant: Valeo Schalter und Sensoren GmbH, Bietigheim-Bissingen (DE)

(72) Inventors: Thomas Heitzmann, Bobigny (FR); Benazouz Bradai, Bobigny (FR)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 280 days.

(21) Appl. No.: 16/617,961

(22) PCT Filed: May 3, 2018

(86) PCT No.: PCT/EP2018/061253
§ 371 (c)(1),
(2) Date: Nov. 27, 2019

(87) PCT Pub. No.: WO2018/219579
PCT Pub. Date: Dec. 6, 2018

(65) Prior Publication Data
US 2020/0118432 A1    Apr. 16, 2020

(30) Foreign Application Priority Data
May 29, 2017   (FR) ...................... 1754694

(51) Int. Cl.
*G08G 1/16*   (2006.01)
*B60W 30/095*  (2012.01)
(Continued)

(52) U.S. Cl.
CPC .......... *G08G 1/167* (2013.01); *B60W 30/0956* (2013.01); *G01C 21/3658* (2013.01);
(Continued)

(58) Field of Classification Search
CPC .......... G08G 1/16; G08G 1/166; G08G 1/167; G01C 21/00; G01C 21/005; G01C 21/34;
(Continued)

(56) References Cited

U.S. PATENT DOCUMENTS

2012/0212612 A1 *   8/2012   Imai ...................... B60W 30/12
                                                         348/148
2013/0321630 A1 *  12/2013   Shin ....................... G08G 1/167
                                                         348/148
(Continued)

FOREIGN PATENT DOCUMENTS

DE   102014215473 A1   2/2016
FR        2976091 A1  12/2012
(Continued)

OTHER PUBLICATIONS

NPL_search (Oct. 2, 2021).*
(Continued)

*Primary Examiner* — Van T Trieu
(74) *Attorney, Agent, or Firm* — Osha Bergman Watanabe & Burton LLP (57) ABSTRACT

A driving assistance functionality for a motor vehicle when approaching a tollgate is disclosed. The method involves a step (S4) of calculating a probability of a tollgate being present based on at least two road context attributes that are determined from the motor vehicle and defining a road context ahead of said vehicle, said road context attributes being decorrelated from any concept of a tollgate. Examples of road context attributes: speed limit signs; marking lines on the ground; speed bumps or rumble strips on the ground; obstacles such as other vehicles; drivable space.

8 Claims, 5 Drawing Sheets

(51) Int. Cl.
   *G01C 21/36* (2006.01)
   *G08G 1/0967* (2006.01)
   *B60W 50/14* (2020.01)
   *G06V 20/58* (2022.01)
   *G06V 20/56* (2022.01)

(52) U.S. Cl.
   CPC ....... *G08G 1/096716* (2013.01); *B60W 50/14* (2013.01); *B60W 2556/50* (2020.02); *B60W 2720/103* (2013.01); *G06V 20/582* (2022.01); *G06V 20/588* (2022.01)

(58) Field of Classification Search
   CPC . G01C 21/36; G01C 21/3658; B60W 30/095; B60W 30/18; B60W 2552/00; B60W 2252/05; B60W 2252/10; B60W 30/00; B60W 2552/05; B60W 2552/10; G06K 9/00791; G06K 9/00798; G06K 9/00818; G06K 9/00
   See application file for complete search history.

(56) References Cited

U.S. PATENT DOCUMENTS

| | | | |
|---|---|---|---|
| 2015/0070501 | A1 | 3/2015 | Ooi |
| 2016/0076894 | A1* | 3/2016 | Choi ..................... B60W 30/00 701/461 |
| 2017/0124407 | A1* | 5/2017 | Micks ................ G06K 9/00604 |
| 2018/0174449 | A1* | 6/2018 | Nguyen ............... G08G 1/0104 |

FOREIGN PATENT DOCUMENTS

| | | |
|---|---|---|
| JP | 2008083816 A | 4/2008 |
| WO | 2008/142343 A2 | 11/2008 |

OTHER PUBLICATIONS

International Search Report and Written Opinion corresponding to International Application No. PCT/EP2018/061253, mailed Jul. 18, 2018 (13 pages).

\* cited by examiner

DRIVING ASSISTANCE FOR A MOTOR VEHICLE WHEN APPROACHING A TOLLGATE

The present invention relates in general to motor vehicles, and more precisely to a driving assistance method and system for the purpose in particular of warning a driver of a motor vehicle about the fact that his vehicle is approaching a tollgate.

BACKGROUND OF THE INVENTION

Numerous driving assistance systems are nowadays offered for the purpose of improving traffic safety conditions, in particular on motorways.

Among the possible functionalities, mention may be made in particular of cruise control or ACC (initials for adaptive cruise control), automatically stopping and restarting the vehicle's engine depending on the traffic conditions and/or signals (traffic lights, stop sign, give way, etc.), assistance for automatically keeping the trajectory of the vehicle in its traffic lane as offered by systems known under the name "lane keeping assistance systems", warning the driver about leaving a lane or unintentionally crossing lines ("lane departure warning"), assistance for changing lanes or LCC (initials for lane change control), etc.

Driving assistance systems thus have the general role of warning the driver about a situation requiring his attention and/or of defining the trajectory that the vehicle has to follow in order to arrive at a given destination, and thereby make it possible to control the units for controlling the steering and braking of the vehicle so that this trajectory is effectively followed automatically. The trajectory should be understood in this case in terms of its mathematical definition, that is to say as being the set of successive positions that have to be occupied by the vehicle over time. Driving assistance systems thus have to define not only the path to be taken, but also the speed profile to be complied with. To this end, they use a large amount of information about the immediate surroundings of the vehicle (presence of obstacles such as pedestrians, bicycles or other motorized vehicles, detecting signposts, road configuration, etc.) coming from one or more detection means such as cameras, radars and lidars fitted to the vehicle, and information linked to the vehicle itself, such as its speed, its acceleration, its position given for example by a GPS navigation system.

Driving on a motorway generally offers relatively safe traffic conditions. For this reason, in the case of purely manually driven vehicles, it is observed that the driver of a vehicle may lower his attention, in particular on long journeys. In addition, even though the vehicle is equipped with systems offering automated driving functionalities, such as cruise control, lane keeping assistance and/or lane changing assistance, some situations that are particularly prone to accidents may require the driver to intervene and/or automatic suppression or modification of the behaviour of the automated driving functionalities.

The fact that a vehicle is about to arrive at a tollgate constitutes one of these accident-prone situations that is more precisely of interest here.

CROSS-REFERENCE TO RELATED APPLICATIONS

The present application is a national phase application of PCT/EP2018/061253, claiming priority to FR 1754694.

DESCRIPTION OF RELATED ART

Document WO 2008/142343 discloses an on-board system for warning a driver of a vehicle about the proximity of a toll area using map data from an on-board GPS satellite navigation system. More precisely, the system extracts the current position of the vehicle with respect to the location of a toll area that is indexed in the map data, and generates a warning as soon as the distance between the vehicle and the toll area drops below a reference distance. The operation of the cruise control of the vehicle may furthermore be automatically suppressed if necessary.

However, numerous defects that are inherent to this system limit the effectiveness thereof. In particular, current mapping is still highly inaccurate and a toll area may not be indexed in the map data. In addition, the map data are not always up-to-date. A loss of GPS coverage is also possible. Lastly, the GPS navigation system is inaccurate, the inaccuracy being of the order of around ten metres.

Another system, described in document US 2015/0070501, uses the detection of specific information about the presence of a tollgate to modify (in particular to suppress) the behaviour of a lane keeping functionality of the vehicle. According to the teaching of this document, the specific information indicating that the vehicle is approaching a tollgate is either information linked unequivocally to the tollgate, for example the visual structure of the tollgate, or information dedicated exclusively to signalling a tollgate, such as a particular pattern or a dedicated series of characters painted on the road or present on a signpost before the tollgate. In both cases, the information is modelled and stored beforehand in a database on board the vehicle. The information is for its part detected by processing images captured by a camera on board the vehicle in order to recognize the presence of the specific information in the image in comparison with the information stored beforehand.

In this case too, the proposed system suffers from limitations. The on-board database thus has to be updated frequently in order to take into account various tollgates. Moreover, the specific patterns or characters indicating the presence of the tollgate may be subject to alterations (worn-off paintwork, signs covered by dirt, etc.), and processing the images will in this case not make it possible to detect their presence.

BRIEF SUMMARY OF THE INVENTION

The aim of the present invention is to mitigate the drawbacks and limitations of the known systems by proposing a more robust and reliable method and system for warning of the approach of a vehicle close to a tollgate.

To this end, one subject of the invention is a driving assistance method for a motor vehicle when approaching a tollgate, comprising a step of calculating a probability of a tollgate being present based on at least two road context attributes that are determined from the motor vehicle and defining a road context ahead of said vehicle, said road context attributes being decorrelated from any concept of a tollgate.

Besides the main features that have just been mentioned, the method according to the invention may comprise one or more additional features from among the following:

the calculation step is advantageously preceded by a step of processing said at least two road context attributes consisting in: extracting parameters associated with said at least two road context attributes; and deriving an indicator representative of the temporal evolution of each extracted parameter, each derived indicator being assigned a confidence index; the probability of a tollgate being present may then be calculated from the confidence indices assigned to each derived indicator;

said at least two road context attributes form part of a set of road context attributes ahead of the motor vehicle comprising: speed limit signs; marking lines on the ground; speed bumps or rumble strips on the ground; obstacles such as other vehicles; drivable space.

said associated parameters form part of a first list comprising: the speed limit extracted from a speed limit sign; the lateral distance between the motor vehicle and a speed limit sign; the number of marking lines on the ground; the number of speed bumps or rumble strips on the ground; the number of obstacles such as other vehicles whose speed is decreasing and/or stopping; the size of the drivable space;

the method may furthermore comprise a step of comparing the calculated probability of presence with a decision threshold;

an audio and/or visual warning in the passenger compartment of the motor vehicle may furthermore be generated when the calculated probability of presence is greater than the decision threshold.

Another subject of the invention is a driving assistance system for a motor vehicle when approaching a tollgate, comprising an on-board processing module able to implement the steps of the above method.

All or some of the road context attributes used to calculate the probability of a tollgate being present are delivered for example by modules for processing images captured by an on-board camera at the front of the motor vehicle.

As a variant or in combination, all or some of the road context attributes used to calculate the probability of a tollgate being present are delivered by modules for processing measurements from a radar and/or a lidar on board the motor vehicle.

BRIEF DESCRIPTION OF THE DRAWINGS

The invention will be better understood upon reading the following detailed description, given with reference to the appended figures, in which.

DETAILED DESCRIPTION OF THE INVENTION

The present invention is based on the principle that it is possible to establish the presence of a tollgate with sufficient probability by generally analysing the road context on the approach to such a tollgate, and by using, for this analysis, various input data formed by detecting at least two road context attributes that are decorrelated a priori from the concept of a tollgate.

The road context attributes to which reference is made above are preferably chosen from the following list:
signposts present on the road, and in particular speed limit signs;
marking lines on the ground;
safety rails;
speed bumps;
static or dynamic obstacles, in particular other vehicles;
drivable space ahead of the vehicle.

These road context attributes are considered to be decorrelated or independent of the concept of a tollgate in that they refer to objects able to be detected (or determined in the case of free space) at any time on any type of road, independently of whether or not a tollgate is being approached. In other words, detecting them on their own does not make it possible to deduce the presence of a tollgate.

However, it is possible to extract associated parameters from these road context attributes, which parameters each have the particular feature of evolving in a relatively specific manner in a context of approaching a tollgate.

These evolution rules will be explained with reference to FIGS. 1 to 4, which schematically illustrate, in plan views, a motor vehicle 1 moving on a road portion 2 situated just before a tollgate 3. It is considered hereinafter by way of nonlimiting example that the road context attributes listed above may be determined, in a manner known per se and that does not form part of the present invention, by using various object recognition algorithms based on processing images captured by a camera 10 on board the motor vehicle 1.

Figure 1:
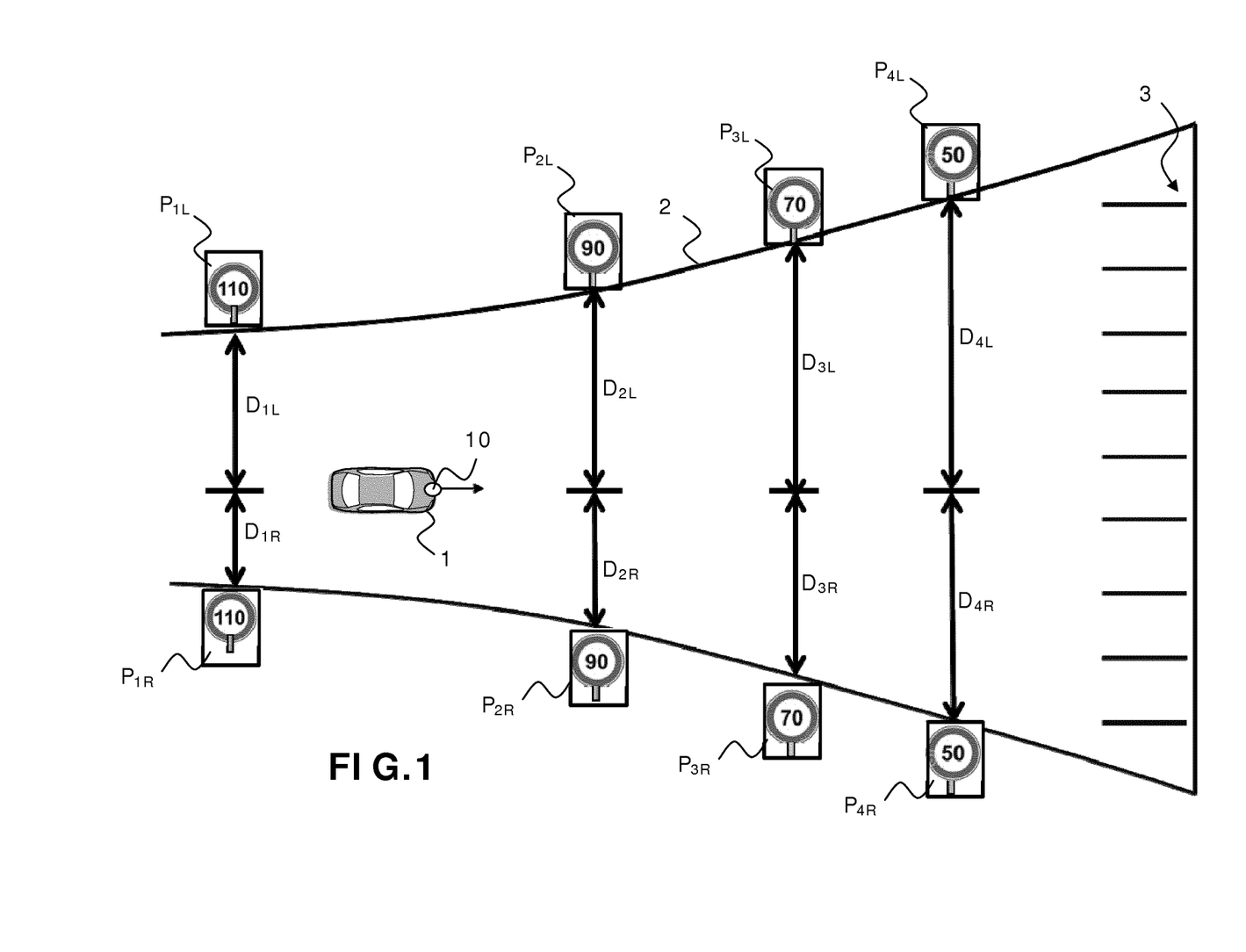
FIGS. 1 to 4 schematically illustrate plan views of various road context attributes of interest according to the invention in a situation when a motor vehicle is approaching a tollgate.

In FIG. 1, what is of interest is the presence of signposts, and in particular speed limit signs. In a context of approaching a tollgate, speed limit signs are generally present, preferably in pairs, on both verges of the road, and indicate a driving speed limit that will decrease as the motor vehicle 1 approaches the tollgate 3. Thus, using a conventional configuration on a French motorway as an example, a first pair $P_{1L}$, $P_{1R}$ of speed limit signs situated respectively to the left and to the right on the verges of the road 2, and indicating a speed limited for example to 110 km/h, will be able to be detected from images captured by the camera 10 situated at the front of the motor vehicle 1, followed by a second pair $P_{2L}$, $P_{2R}$ of speed limit signs indicating a speed limited to 90 km/h, and then a third pair $P_{3L}$, $P_{3R}$ of speed limit signs indicating a speed limited to 70 km/h, followed lastly by a fourth and final pair $P_{4L}$, $R_{4R}$ of speed limit signs indicating a speed limited to 50 km/h.

Furthermore, the distance between two speed limit signs of one and the same pair increases as the tollgate 3 is approached due to the widening of the road. As a result, all of the signs $P_{1L}$, $P_{2L}$, $P_{3L}$ and $P_{4L}$ that will be detected by the motor vehicle 1 to the left thereof are situated at increasing respective distances $D_{1L}$, $D_{2L}$, $D_{3L}$ and $D_{4L}$ with respect to the vehicle 1 (assuming that the vehicle 1 stays in its driving lane). Likewise, all of the signs $P_{1R}$, $P_{2R}$, $P_{3R}$ and $P_{4R}$ that will be detected by the motor vehicle 1 to the right thereof are situated at increasing respective distances $D_{1R}$, $D_{2R}$, $D_{3R}$ and $D_{4R}$ with respect to the vehicle 1.

Thus, by simply detecting a first road context attribute formed by the speed limit signs present on the road, it is possible to extract, as associated parameters, the speed limit value indicated by each detected sign and, if these limit signs are present in pairs, the distance between each sign detected by the motor vehicle 1, and then to derive:

firstly, a first indicator representative of the evolution of the speed limit, likely to correspond to a situation of approaching a tollgate if this evolution corresponds to a gradual decrease in the speed limit;

secondly, a second indicator representative of the evolution of the distance between the motor vehicle 1 and each speed limit sign that is successively detected, in this case also likely to correspond to a situation of approaching a tollgate when this second indicator shows an increase in this distance.

Figure 2:
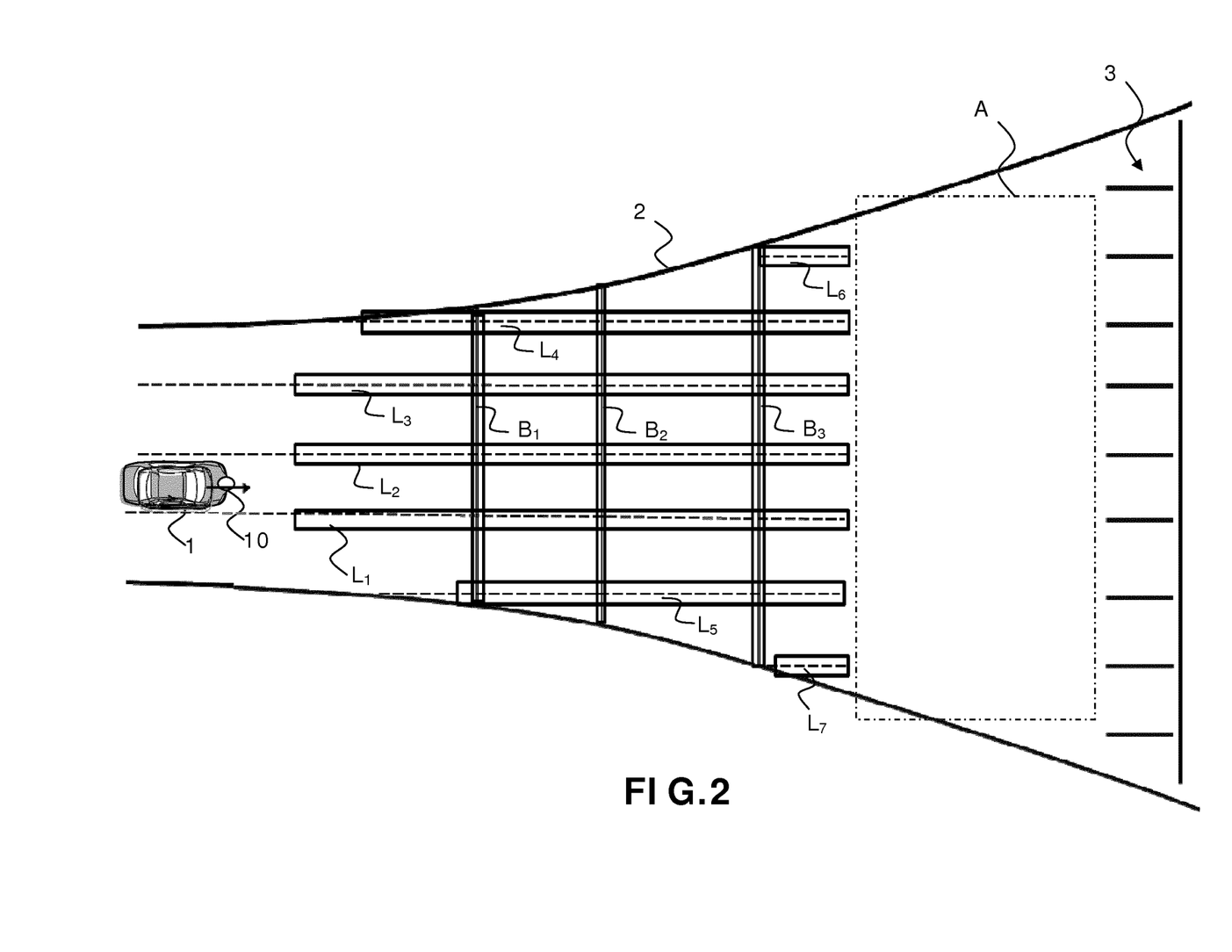

In the case of FIG. 2, what is of interest is a second road context attribute formed by the marking lines on the ground, and a third road context attribute corresponding to the presence of speed bumps or rumble strips. In a context of approaching a tollgate, the number of marking lines present on the ground will generally increase as the motor vehicle 1 approaches the tollgate 3. In the example of FIG. 2, processing the images captured by the front camera 10 in a manner known per se makes it possible to extract the presence of the marking lines $L_1$ to $L_7$ as the vehicle 1 moves. Thus, in the situation that is shown, the vehicle 1 will begin by detecting the three marking lines $L_1$, $L_2$, $L_3$, and then the additional marking line $L_4$, and then the line $L_5$, and lastly the marking lines $L_6$ and $L_7$. The vehicle 1 may then pass through an area A in which there is no longer any marking line on the ground.

Thus, from simply detecting the second road context attribute formed by the marking lines on the ground, it is possible at all times to extract the number of marking lines that are detected, and then to derive a third indicator representative of the evolution of this number, likely to correspond to a situation of approaching a tollgate if this evolution corresponds to an increase in the number of detected marking lines on the ground, possibly followed by a return to zero (disappearance of the lines in the area A).

Moreover, speed bumps or rumble strips, such as the speed bumps $B_1$, $B_2$ and $B_3$ in FIG. 2, are generally present on the ground on the approach to a tollgate in order to prompt drivers to slow down. Counting these speed bumps or rumble strips is therefore a fourth possible indicator likely to correspond to a situation of approaching a tollgate, generated from simply detecting the third road context attribute formed by the speed bumps and/or rumble strips on the ground.

Figure 3:
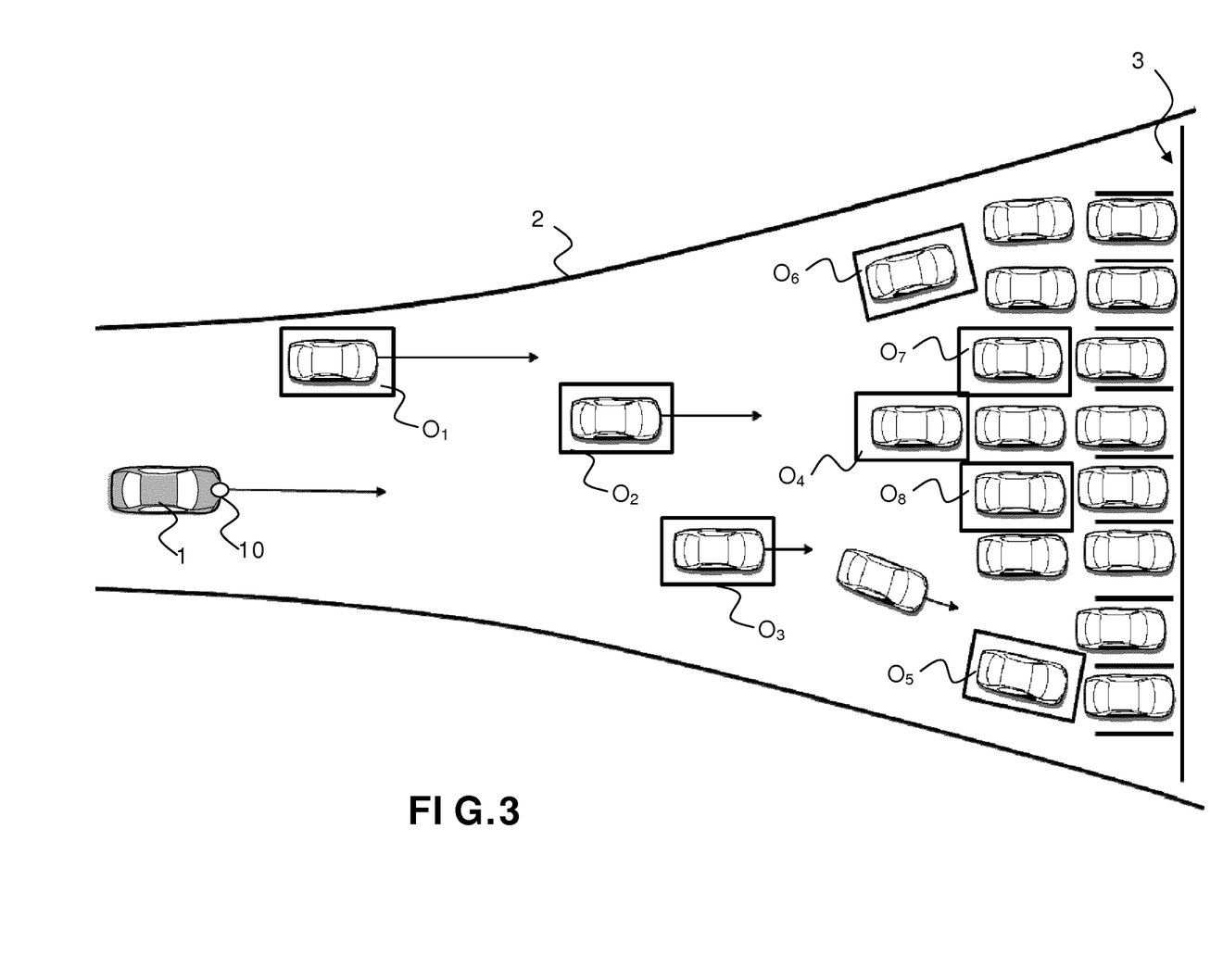

In the case of FIG. 3, what is of interest is a fourth road context attribute formed by obstacles present ahead of the vehicle 1, such as other vehicles. In a context of approaching a tollgate, the number of obstacles will generally increase as the motor vehicle 1 approaches the tollgate 3. In the example of FIG. 3, processing the images captured by the front camera 10 in a manner known per se makes it possible to extract the presence of the obstacles $O_1$ to $O_8$ as the vehicle 1 moves. It should be noted that obstacles such as other vehicles may also be detected from measurements performed by a radar or a laser sensor on board the motor vehicle 1. Regardless of the type of sensor and the processing associated with the obstacle detection, each detection that is performed makes it possible to ascertain not only the relative position of the detected obstacle with respect to the motor vehicle 1, but also its relative speed. One particular feature that is observed in a context of approaching a tollgate is that vehicles in front will generally all slow down (possibly stop).

Thus, from simply detecting the fourth road context attribute formed by the mobile obstacles ahead of the vehicle 1, it is possible to derive a fifth indicator representative of the evolution of the number of other vehicles slowing down, or even stopping, likely to correspond to an approach situation if this evolution corresponds to an increase in the number of these vehicles.

Figure 4:
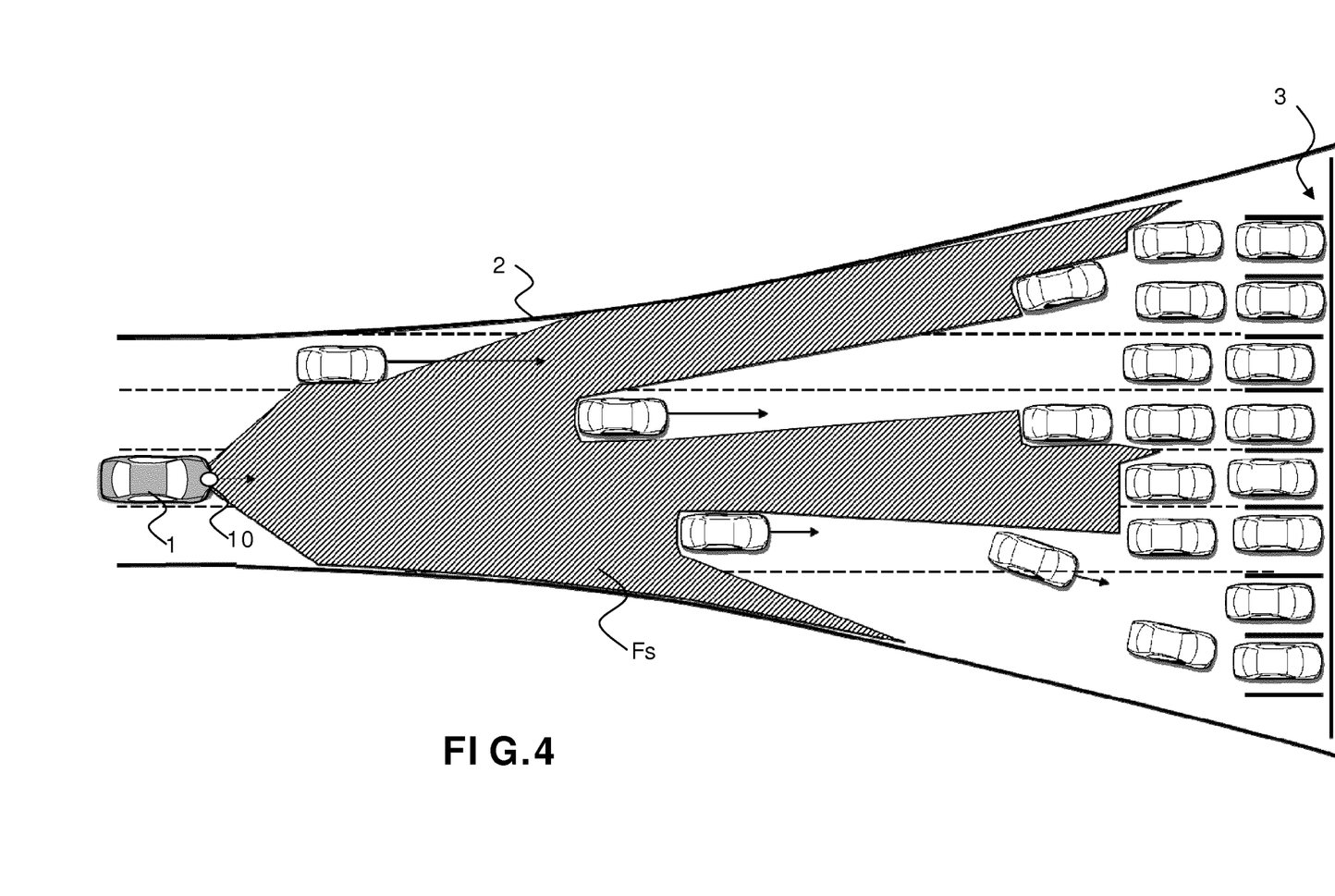

FIG. 4 lastly illustrates a fifth road context attribute formed here by the free driving space or drivable space situated ahead of the motor vehicle 1. The drivable space corresponds to the areas in which the vehicle is able to move safely. The space ahead of a vehicle is considered to be "non-drivable" as soon as static obstacles (road edges, signposts, parked vehicles, etc.) or dynamic obstacles (moving vehicles, pedestrians, etc.) are present. Determining the drivable space therefore requires knowing, for each point in the total space ahead of the vehicle, whether this is free or occupied. There are nowadays various ways of determining the drivable space, for example by performing real-time processing of images captured by the camera 10, in order to extract various information about the space ahead of the vehicle using various recognition algorithms. Image processing makes it possible to classify each pixel of an image into three categories or markers depending on whether this pixel should be associated with the road, with a static or dynamic obstacle (cars, pedestrians, barriers, signposts, etc.) or with a background. It is then possible to extract a two-dimensional geometric representation of at least one contour defining the drivable space ahead of the vehicle. There are also other methods for extracting the contour of the drivable space based on waves emitted by a sensor (such as radar, lidar or ultrasound sensor) that will reflect off obstacles a certain distance away. The contour or contours extracted from the points of impact that are obtained define the area or areas for which the emitted waves have not encountered obstacles. FIG. 4 illustrates, using the reference $F_s$, an example of a drivable space contour extracted ahead of the vehicle 1.

In a context of approaching a tollgate such as the tollgate 3, the size of the drivable driving space $F_s$ will generally increase as the motor vehicle 1 moves towards the tollgate 3, primarily due to the fact that the road widens at this location. Therefore, the extraction of the road context attribute formed by the drivable driving space is one possible additional item of input data from which it is possible to derive a sixth indicator representative of the evolution of the size of the drivable driving space, likely to correspond to an approach situation if this evolution corresponds to an increase in this size.

In light of the above, it is observed that none of the five road context attributes described above makes it possible on its own to detect the tollgate as such. However, by using at least two of these road context attributes to extract associated parameters, by deriving the abovementioned indicators representative of the temporal evolution of these parameters, and by analysing the evolution of these indicators as the motor vehicle 1 moves forward, it is possible to calculate a probability of a tollgate being present.

Figure 5:
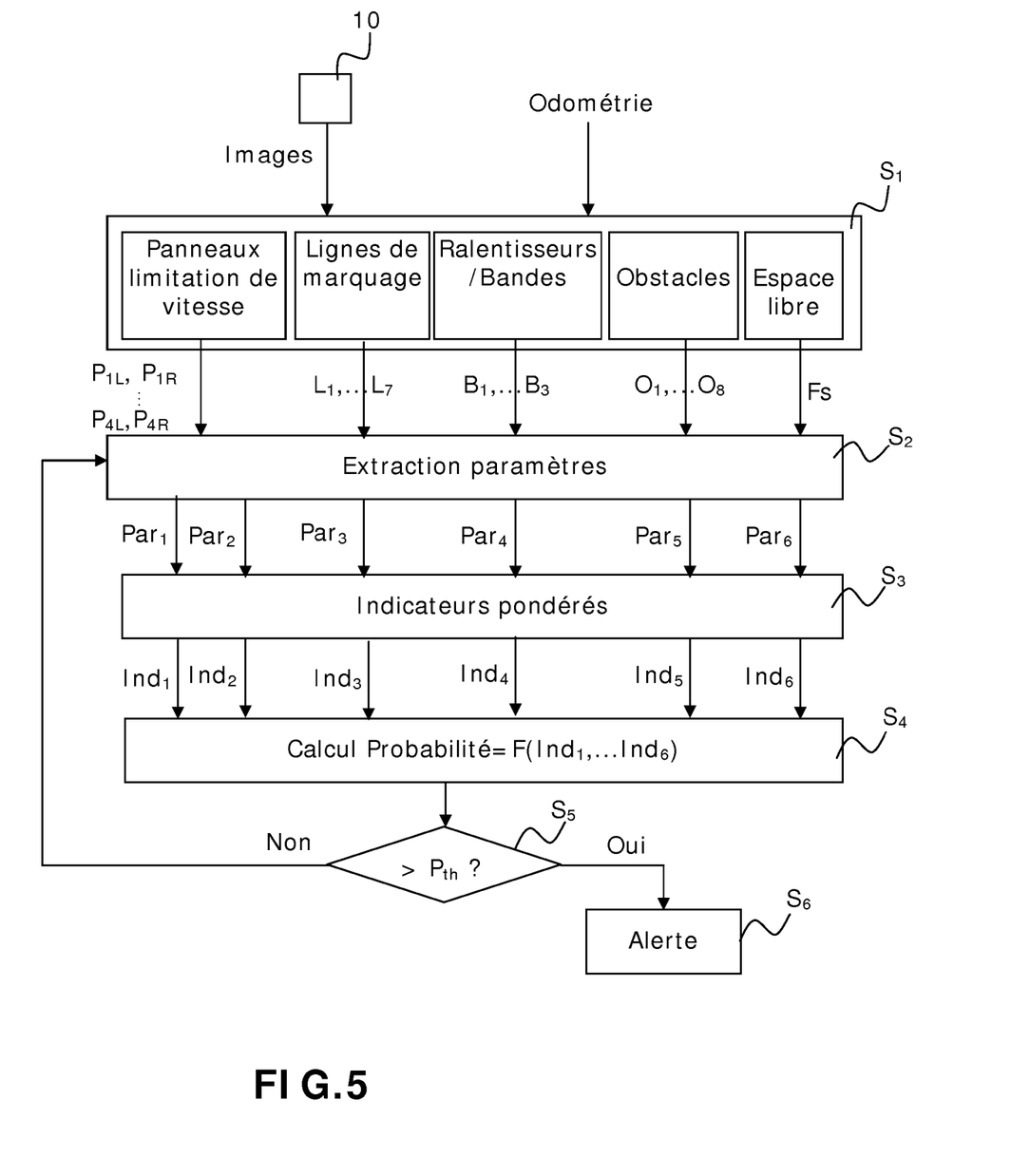
FIG. 5 shows a sequence of steps able to be implemented in a driving assistance system according to the invention.

FIG. 5 gives an example of processing steps able to be implemented by a driving assistance system of a motor vehicle, such as the motor vehicle 1 in FIGS. 1 to 4, when approaching a tollgate. It is assumed here that the vehicle 1 is equipped with a front camera 10. However, it is not essential for the camera to be a front camera. The camera may be situated anywhere. A first step $S_1$ corresponds to determining various road context attributes from processing images captured by the camera 10, and odometry parameters (speed, acceleration) of the vehicle 1. This step may moreover be implemented in the context of other driving assistance functionalities, such as ACC, keeping the vehicle in its lane, and/or lane changing assistance. It is assumed by way of nonlimiting example in this figure that all of the abovementioned road context attributes are in this case available at the end of step $S_1$.

The following step $S_2$ represents the extraction of the parameters associated with the context attributes. In particular:

the parameters denoted $Par_1$ and $Par_2$ correspond respectively to the speed limit extracted from a speed limit sign $P_{1L}$, $P_{1R}$, ... $P_{4L}$, $P_{4R}$ detected in step $S_1$ and to the lateral distance $D_{1L}, D_{1R}, \ldots D_{4L}, D_{4R}$ between the vehicle 1 and the detected speed limit sign;

the parameter $Par_3$ corresponds to the number of marking lines detected ahead of the motor vehicle, such as the marking lines $L_1$ to $L_7$ from the road situation shown in FIG. 2;

the parameter $Par_4$ corresponds to the number of speed bumps or rumble strips on the ground that are detected ahead of the motor vehicle, such as the speed bumps or rumble strips on the ground $B_1$ to $B_3$ from the road situation shown in FIG. 2;

the parameter $Par_5$ corresponds to the number of other vehicles detected ahead of the motor vehicle, such as the obstacles $O_1$ to $O_8$ from the road situation shown in FIG. 3;

the parameter $Par_6$ corresponds to the size of the drivable space determined ahead of the vehicle.

In step $S_3$, an indicator $Ind_1$ to $Ind_6$ representative of the temporal evolution of each parameter $Par_1$ to $Par_6$ is derived from the parameter. A confidence index is advantageously assigned to each indicator so as to give a different weight to the analysis of the road context. For example, a lower weight may be assigned to the indicators $Ind_1$ and $Ind_2$ (associated with the speed limit signs, and/or to the indicator $Ind_3$ associated with the marking lines on the ground), due to the fact that the road signs and/or the lines on the ground may be covered with dust or partly or even completely worn away. The confidence indices or weights may be parameterized beforehand in the system. As a variant, a road learning process, such as the one implemented by an SVM (support vector machine) process, a Bayesian network, a neural network or a fuzzy logic algorithm, may make it possible to refine these confidence indices on the basis of the conditions encountered on the road.

Step $S_4$ shows the step of calculating the probability of a toll barrier being present, from these confidence indices.

The probability of presence is then compared with a decision threshold $P_{th}$ (step $S_5$), for example equal to 0.5. Thus, when the calculated probability becomes greater than the decision threshold, it is possible to conclude that the motor vehicle is approaching a tollgate, and for example generate a visual and/or audio warning within the passenger compartment of the vehicle (step $S_6$).

The invention thus makes it possible to use road context attributes that are often already available when the vehicle is equipped with other driving assistance functionalities, for another purpose (in this case detecting a situation of approaching a tollgate). As has been indicated above, the invention may be implemented using only two road context attributes. However, a more robust calculation of the probability is achieved using more than two attributes. The benefit is that the assistance functionality remains operational even when some of the attributes are not detected correctly.

The invention claimed is:

1. A driving assistance method for a motor vehicle when approaching a tollgate, comprising:
    calculating a probability of a tollgate being present based on at least two road context attributes that are determined from the motor vehicle;
    defining a road context ahead of said motor vehicle, said road context attributes being decorrelated from any concept of a tollgate; and
    prior to calculating the probability of a tollgate being present, processing said at least two road context attributes by:
        extracting parameters associated with said at least two road context attributes; and
        deriving an indicator representative of the temporal evolution of each extracted parameter, each derived indicator being assigned a confidence index,
        wherein the probability of the tollgate being present is calculated from the confidence indices assigned to each derived indicator.

2. The method according to claim 1, wherein said at least two road context attributes form part of a set of road context attributes ahead of the motor vehicle comprising:
    speed limit signs;
    marking lines on the ground;
    speed bumps or rumble strips on the ground;
    obstacles such as other vehicles;
    drivable space.

3. The method according to claim 1, wherein said associated parameters form part of a first list comprising:
    the speed limit extracted from a speed limit sign;
    the lateral distance between the motor vehicle and a speed limit sign;
    the number of marking lines on the ground;
    the number of speed bumps or rumble strips on the ground;
    the number of obstacles such as other vehicles whose speed is decreasing and/or stopping;
    the size of the drivable space.

4. The method according to claim 1, further comprising: comparing the calculated probability of presence with a decision threshold.

5. The method according to claim 4, further comprising: generating an audio and/or visual warning in a passenger compartment of the motor vehicle when the calculated probability of presence is greater than the decision threshold.

6. A driving assistance system for a motor vehicle when approaching a tollgate, comprising: an on-board processing module configured to:
    calculate a probability of a tollgate being present based on at least two road context attributes that are determined from the motor vehicle,
    define a road context ahead of said motor vehicle, said road context attributes being decorrelated from any concept of a tollgate, and
    prior to calculating the probability of a tollgate being present, process said at least two road context attributes by:
        extracting parameters associated with said at least two road context attributes; and
        deriving an indicator representative of the temporal evolution of each extracted parameter, each derived indicator being assigned a confidence index,
        wherein the probability of the tollgate being present is calculated from the confidence indices assigned to each derived indicator.

7. The driving assistance system according to claim 6, wherein all or some of the road context attributes used to calculate the probability of a tollgate being present are delivered by modules for processing images captured by an on-board camera at the front of the motor vehicle.

8. The driving assistance system according to claim 6, wherein all or some of the road context attributes used to calculate the probability of a tollgate being present are delivered by modules for processing measurements from a radar and/or a lidar on board the motor vehicle.

* * * * *